Nov. 18, 1958  J. W. JONASSEN  2,860,828
COMPRESSOR
Filed July 29, 1954  2 Sheets-Sheet 1

INVENTOR.
JORGEN W. JONASSEN
BY Edwin S. Hall
ATTORNEY

Nov. 18, 1958  J. W. JONASSEN  2,860,828
COMPRESSOR
Filed July 29, 1954  2 Sheets-Sheet 2
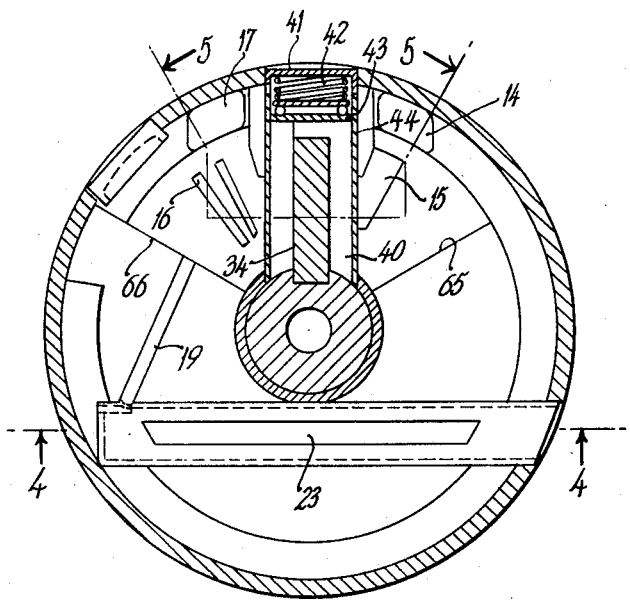
Fig. 3
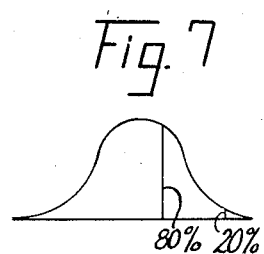
Fig. 7
Fig. 5
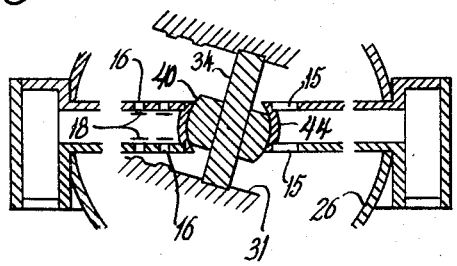
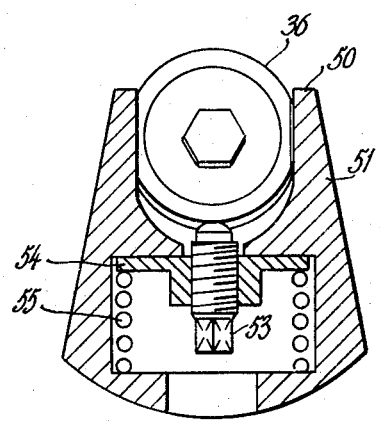
Fig. 4
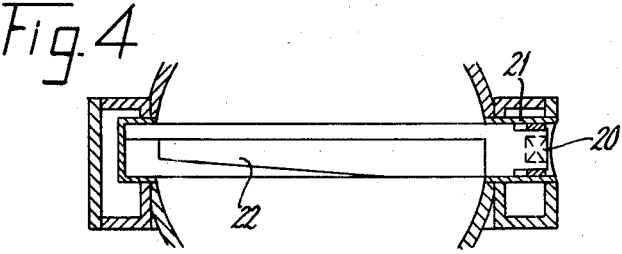
Fig. 6
INVENTOR.
JORGEN W. JONASSEN
BY Edwin S. Hall
ATTORNEY United States Patent Office 2,860,828
Patented Nov. 18, 1958

2,860,828

COMPRESSOR

Jorgen W. Jonassen, Rutherford, N. J.

Application July 29, 1954, Serial No. 446,467

3 Claims. (Cl. 230—138)

This invention relates to compressors of the conic-crank class, the class in which the axis of the driving crank describes a cone. Its principal object is to provide improvements in the construction, arrangement, and control of conic-crank pumps and compressors. Other objects are to provide an improved compressor of variable capacity at constant speed; to provide an improved means of driving the displacer permitting ready adjustability of the working clearances and an overload release or safety valve inherent in the mechanism; to provide improved means for cooling the displacer and distributing the heat of compression; and to provide an improved compressor capable of high-speed operation with perfect dynamic balance. Another object is to provide an improved compressor readily adaptable for use in multiple units either in parallel or for multi-stage operation.

These and other objects of the invention will be apparent from the following description taken in connection with the drawings in which—

Fig. 3 is a transverse section on the line 3—3 of Fig. 1;

Fig. 4 is a sectional view taken on the line 4—4 of Fig. 3;

Fig. 5 is a sectional view on the broken line 5—5 of Fig. 3;

Fig. 6 is a transverse section of the driving mechanism taken on the line 6—6 of Fig. 1; and Fig. 7 is a diagram showing the range of the capacity control.

Figures 1, 2:
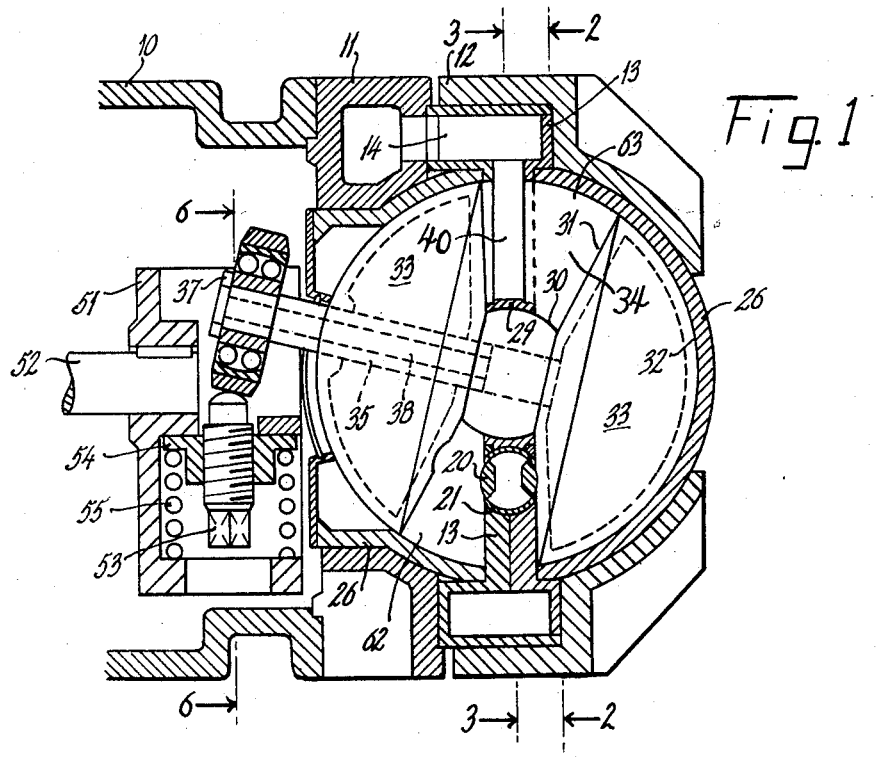
Fig. 1 is a longitudinal section of the compressor.
Fig. 2 is a transverse section on the line 2—2 of Fig. 1.

Referring to the drawings, attached to the motor housing 10 are the frame members 11 and 12 of the compressor with the separating diametrical disc 13 between them. Diametrical disc 13 consists of several parts and is provided with inlet passage 14, inlet port 15, discharge ports 16, and discharge passage 17. Discharge ports 16 are provided wtih reed valve plates 18.

Diametrical disc 13 is also provided with a spiral plug valve 20 operable in bushing 21, the plug valve 20 having a spiral slot 22 coacting progressively with straight slot 23 of disc 13. Unloading conduit 19 connects plug valve 20 with discharge passage 17.

Spherical liners 26 are clamped between frame members 11 and 12 with diametrical disc 13. Disc 13 is provided with a central spherical bushing 29. Operable in bushing 29 is the pilot ball 30 of wabbler 33 which has conical surfaces 31 coacting with disc 13 and spherical surfaces 32 operable within spherical liners 26.

A sector-shaped dividing plate 34 connects the two conical surfaces 31 of wabbler 33. Dividing plate 34 is slidable within fork 40 which may oscillate in a radial sleeve 44 in diametrical disc 13. Fork 40 is held in contact with pilot ball 30 by ball bearing 43, spring 42, and cap 41. Dividing plate 34 and fork 40 form a radial partition in pumping chambers 62 and 63, and serve to separate the inlet ends (having inlet ports 15) of the chambers from their discharge ends (having discharge ports 16).

Wabbler 33 is operable by conic crank 35 on which is mounted ball bearing 36 secured by nut 37. Conic crank 35 is provided with conduit 38 connecting with the hollow interior chambers of the spherical sectors of wabbler 33.

Ball bearing 36 fits slidably within fork 50 of driving member 51 keyed to the motor shaft 52. Operating clearance or contact of conical faces 31 of wabbler 33 with disc 13 may be adjusted by screw 53. Screw 53 is threaded into washer 54 which is normally seated by spring 55 as shown in Figs. 1 and 6.

Diametrical disc 13 has several functions. It is a wall between pumping chambers 62 and 63. It provides channels for inlet and discharge. It houses the discharge valves. It houses the control valve means and facilitates the provision of stepless or continuous control of the compressor output.

In operation, motor shaft 52 drives forked member 51 causing conic crank 35 and wabbler 33 to gyrate in pilot bushing 29 and within spherical liners 26. Air or other working medium is sucked thru inlet ports 15 into pumping chambers 62 and 63, and forced out thru discharge ports 16 by the pumping action of wabbler 33 in a well-known manner.

Compression in either chamber 62 or 63 normally begins when the contact line between conical surface 31 and disc 13 passes radial lip 65 of disc 13, as shown in Fig. 3. Obviously if the radial lip 65 were rotatable in the forward direction the start of compression could be delayed and the output per revolution correspondingly reduced until, finally, as lip 65 approaches lip 66, the output would be zero.

Substantially equivalent control of the output per revolution is had by turning plug valve 20 to permit its spiral slot 22 to overlap more and more of the straight slots 23, thus opening progressively a bypass between pumping chambers 62 and 63 until, finally, plug valve 20 opens into unloading conduit 10, thereby providing a free passage between discharge passages 17 and inlet passages 14.

As shown in Fig. 7, almost no compression takes place between the time when the contact of conical surface 31 with disc 13 passes radial lip 65 and the time when the contact passes the beginning of the bypass thru slots 22 and 23. Substantially continuous control of the output of the compressor from maximum to zero delivery at constant speed is thus attained by this invention.

To avoid hot spots within the compressor and to aid in carrying heat out of the compressor, liquid coolant may be introduced through conduit 38 in conic crank 35, and allowed to rotate in the interior spaces of the spherical sectors of wabbler 33. Since wabbler 33 is prevented from rotating by plate 34 slidably coacting with fork 40, the coolant will flow around within the spherical sectors of wabbler 33 by centrifugal force, and equalize the temperatures of all parts of wabbler 33. Spherical surfaces 32 of wabbler 33 operate with minimum running clearance with respect to spherical liners 26; heat may be transferred from wabbler 33 to liners 26 and thence to frame members 11 and 12.

Adjusting screw 53 may be set to maintain the desired contact or small running clearance between conical surfaces 31 and disc 13. In case of overload, spring 35 will be compressed allowing conical surfaces 31 to back away from disc 13, thus making the compressor inoperable. This structure has the function of an unloading device or safety valve.

It is obvious to one skilled in the art that compressors of this type could be arranged in multiple units corresponding to multi-cylinder piston compressors either to operate in parallel but out of step to produce a smoother output, or in series as a multi-stage compressor.

Having thus described the invention and its operation, it is obvious that the objects as stated have been attained in a practical way. It is understood that changes may be made in the construction and in the arrangement of the various parts of the compressor without departing from the spirit or scope of the invention as expressed in the following claims.

I claim:

1. A conic crank compressor comprising a housing having a substantially spherical interior, a diametrical disc member separating said spherical interior into two pumping chambers each less than hemispherical, inlet and discharge ports and passages in said diametrical disc member and opening into and from said pumping chambers, a ball socket central in said disc member and a sleeve in said disc member extending radially from said socket to the periphery of said housing, a wabbler comprising a pilot ball operably mounted in said socket and a pair of spherical sectors operable within said pumping chambers and having conical faces coacting with said diametrical disc member, a dividing plate radiating from said pilot ball and connecting said spherical sectors, a fork slidably astride said dividing plate and operable within said sleeve and forming with said dividing plate a radial partition across said pumping chambers, and conic crank means for causing the axis of said wabbler to describe a cone and for causing said spherical sectors to gyrate in said pumping chambers to transfer a working medium from said inlet ports on one side of said radial partition to said discharge ports on the other side thereof.

2. A conic crank compressor comprising a housing having a substantially spherical interior, a diametrical disc member separating said spherical interior into two pumping chambers each less than hemispherical, inlet and discharge ports and passages in said diametrical disc member and opening into and from said pumping chambers, a ball socket central in said disc member and a sleeve in said disc member extending radially from said socket to the periphery of said housing, a wabbler comprising a pilot ball operably mounted in said socket and a pair of spherical sectors operable within said pumping chambers and having conical faces coacting with said diametrical disc member, a dividing plate radiating from said pilot ball and connecting said spherical sectors, a fork slidably astride said dividing plate and operable within said sleeve and forming with said dividing plate a radial partition across said pumping chambers, a variable bypass through said diametrical disc member connecting said pumping chambers, means for adjusting said bypass, and conic crank means for causing the axis of said wabbler to describe a cone and for causing said spherical sectors to gyrate in said pumping chambers to transfer a working medium from said inlet ports on one side of said radial partition to said discharge ports on the other side thereof.

3. A conic crank compressor comprising a housing having a substantially spherical interior, a diametrical disc member separating said spherical interior into two pumping chambers each less than hemispherical, inlet and discharge ports and passages in said diametrical disc member and opening into and from said pumping chambers, a ball socket central in said disc member and a sleeve in said disc member extending radially from said socket to the periphery of said housing, a wabbler comprising a pilot ball operably mounted in said socket and a pair of spherical sectors operable within said pumping chambers and having conical faces coacting with said diametrical disc member, a dividing plate radiating from said pilot ball and connecting said spherical sectors, a fork slidably astride said dividing plate and operable within said sleeve and forming with said dividing plate a radial partition across said pumping chambers, conic crank means for causing the axis of said wabbler to describe a cone and for causing said spherical sectors to gyrate in said pumping chambers to transfer a working medium from said inlet ports on one side of said radial partition to said discharge ports on the other side thereof, and valve means for progressively delaying the start of compression to control the output of said compressor, said valve means including a straight slot in said diametrical disc member forming a bypass between said pumping chambers and a plug valve interrupting said straight slot and having a spiral slot coacting progressively with said straight slot to control the output of said compressor continuously from a maximum to a minimum.

References Cited in the file of this patent

UNITED STATES PATENTS

| 958,408 | Kadow | May 17, 1910 |
| 2,015,826 | Vincent | Oct. 1, 1935 |
| 2,087,772 | Kempthorne | July 20, 1937 |
| 2,211,417 | Granberg | Aug. 13, 1940 |
| 2,353,780 | Neuland | July 18, 1944 |

FOREIGN PATENTS

| 15,766 | Switzerland | Nov. 30, 1897 |
| 251,525 | Germany | Oct. 4, 1912 |